United States Patent [19]

Holbek

[11] Patent Number: 4,486,501

[45] Date of Patent: Dec. 4, 1984

[54] PROCESS FOR THE PREPARATION OF FIBERS

[76] Inventor: Kjeld Holbek, Lejrevej 74, DK-4320 Lejre, Denmark

[21] Appl. No.: 468,192

[22] Filed: Feb. 22, 1983

Related U.S. Application Data

[63] Continuation of Ser. No. 247,747, Mar. 26, 1981, abandoned.

[30] Foreign Application Priority Data

Jul. 31, 1979 [DK] Denmark .............................. 3246/79

[51] Int. Cl.³ .......................... D02G 3/00; B05D 5/10
[52] U.S. Cl. .................................. 428/375; 427/208.2; 427/221; 427/355; 427/369; 427/375; 427/444; 427/445
[58] Field of Search ................. 427/208.2; 162/26, 23; 8/495, 159; 57/258, 224; 69/1; 241/185, 28, 4, 27; 428/375, 392, 393, 394, 395

[56] References Cited

U.S. PATENT DOCUMENTS

| | | | |
|---|---|---|---|
| 2,402,160 | 6/1946 | Heritage | 92/6 |
| 2,759,837 | 8/1956 | Roberts | 162/23 X |
| 3,668,195 | 6/1972 | van der Geer | 162/26 X |
| 3,684,564 | 8/1972 | Lefrancois | 427/208.2 X |
| 3,922,418 | 11/1975 | Lauchenauer | 427/208.2 X |
| 3,950,218 | 4/1976 | Levesque | 162/201 |
| 4,059,715 | 11/1977 | Pletcher | 427/208.2 X |
| 4,154,357 | 5/1979 | Sheard et al. | 264/126 X |
| 4,160,059 | 7/1979 | Samejima | 264/126 X |
| 4,244,999 | 1/1981 | Koula | 427/208.2 X |

*Primary Examiner*—Thurman K. Page
*Attorney, Agent, or Firm*—Hubbell, Cohen, Stiefel & Gross

[57] ABSTRACT

Fibers coated with polymer are prepared by adding the polymer to a fiber material, typically cellulose pulp, and subjecting the fiber material with the added polymer to impact of grinding forces in a defibrator, typically a hammer mill. The resulting fibers are very efficiently coated with the polymer and are suitable as binder fibers in fibrous materials consisting completely or partially of the coated fibers bonded through the polymer, and as reinforcing fibers in fiber-reinforced cement products. The polymer is preferably applied as a hot melt, and the defibration is performed immediately after the application.

26 Claims, No Drawings

PROCESS FOR THE PREPARATION OF FIBERS

This is a continuation of application Ser. No. 247,747, filed Mar. 26, 1981, now abandoned.

The present invention relates to a method of making fibers coated with one or more polymers. Fibers of that type may be used for several different purposes, for example as reinforcing fibers in matrices of organic and/or inorganic materials such as concrete, plastic etc., and as reinforcing and/or binding fibers in paper, paste board, card board, and other fiber sheet materials.

The fibers to be coated may be of any suitable type, comprising inorganic and organic fibers, such as metal fibers, mineral fibers and cellulose fibers or cellulose-containing fibers. In the present specification the term "cellulose-containing fibers" is intended to comprise pulp fibers such as sulphate pulp fibers, sulphite pulp fibers, semichemical pulp fibers, chemi-mechanical pulp fibers, semimechanical pulp fibers and mechanical pulp fibers, for example prepared from soft wood or hard wood, straw or bark. The pulp may be bleached or unbleached. The pulp fibers may be in the form of discrete fibers (wet or dry), sheets, rolls, granulates, bales or the like. Important cellulose-containing fibers, which may be used in connection with the present method, are waste fibers, for example waste paper or waste cardboard. However, the cellulose-containing fibers may also be fiber bundles, saw dust, wood chips, shavings, wood wool, or synthetic cellulose fibers.

The polymer or polymers by means of which the fibers are coated by the method according to the present invention may be of any type which is proper for the intended final use of the coated fibers. Such polymers may, for example comprise synthetic polymers, including polyolefins such as polyethylene and polypropylene, vinyl polymers such as polyvinylchloride, polyvinylacetate and polystyrene, polyimides, polyamides, polyacrylates, ABS, epoxy resins, epoxy/phenol resins, phenol resins, urea resins, melamine, polyester resins, melaminepolyester, cross-linked acrylic resins, silicone resins, polyurethane resins, and copolymerisates thereof such as copolyamides. Also natural polymers and polymer-like substances such as bitumen are contemplated. The polymers may be thermoplastic or thermosetting.

The polymer in question should preferably be selected in such a manner that the charging on the fibers and on the polymer or polymers are opposite so as to obtain an adhesive effect between the fiber and the polymer.

Specially preferred polymers are polyacrylates as they can be exposed to cross-linking, and they are colourfast, flexible, and heat-resistant.

The method according to the invention comprises adding said polymer or polymers to the fiber material and exposing the fiber material and the polymer or polymers to impact or grinding forces in a defibrator. The impact or grinding applied to the fiber material and the polymer or polymers generates sufficient heat to cause melting or softening of the polymer or polymers whereby they will adhere to each of the defibrated fibers. Coated fibers may be cooled within the defibrator, for example by means of flow of cooling air, so as to harden the polymer coating on the single defibrated fibers immediately after the coating process so as to prevent them from sticking together.

In order to obtain maximum attraction between the polymer and the fibers and minimum of waste of the polymer, said polymer or polymers preferably comprise one or more coupling agent which may, for example be a metal oxide acylate, silane, and/or metal complexes. The most important of these coupling agents, which may be used alone or in so-called "metal oxide acylates", which is a class of compounds invented by Dr. Jacobus Rinse and disclosed for example in Belgian Pat. No. 555,969, Netherlands Pat. No. 104,261, U.S. Pat. Nos. 3,087,949, 3,243,447, 3,177,238, 3,518,287, 3,625,934, 3,546,262, 3,634,674 and 3,673,229 and Belgian Pat. No. 735,548, and U.K. Pat. Nos. 1,230,412, 1,274,718, 1,552,601 and 1,552,602. The metal oxide acylates are believed to be able to react chemically with the hydroxy groups of cellulose-containing fibers, resulting in the attachment of a metal acylate group via an oxygen bridge. Metal oxide acylates may be prepared from a variety of metals, and it is also possible to prepare metal oxide acylates containing more than one metal in the molecule. Hence, metal oxide acylates may be tailored for the present purpose as hydrofobizing agents (aluminum oxide acylates such as aluminum oxide tallate or aluminum oxide stearate or titanium oxide acylates such as titanium oxide versate and silicon oxide acylates), biocidal metal oxide acylates such as copper oxide acylates and zinc oxide acylates, and fire-retardant metal oxide acylates such as antimonum oxide acylates. Further interesting metal oxide acylates for the present purpose are oxide acylates of chromium, iron, manganese, and zirconium. The metal oxide acylates may function both as coupling agents, softeners and as film forming polymer.

An interesting feature of the metal oxide acylates is their ability to remove or prevent the formation of static electricity.

The fiber material and the polymer or polymers may be fed to the defibrator independently. It is preferred, however, that the polymer or polymers are applied to the fiber material prior to feeding it into the defibrator. Thereby it is possible to obtain a substantially uniform distribution of the polymer or polymers in the fiber material being fed to the defibrator.

The polymer or polymers being added to the fiber material may be in the form of dry particles. However, this is not preferred because it is difficult to obtain a substantially uniform distribution of such particles within the fiber material. It is more preferred to add the polymer or polymers to the fiber material in the form of a suspension of solid particles or in the form of a solution. A suspension of solid particles is preferably water-based and may suitably contain the particles suspended by means of, e.g., a cationic polyelectrolyte. The liquid in which the polymer or polymers is dissolved or suspended tends to provide a cooling effect in the defibrator.

However, in the most preferred embodiment of the method according to the invention, the polymer or polymers are added to the dry fiber material in a melted or heat-softened condition, whereby use of a liquid solvent or a dispersion solvent may be avoided. In this method it is preferred to use polymers with a high stickiness temperature, e.g. from about 75° C. to about 260° C. and, in some cases, up to about 400° C. The term "stickiness temperature" is intended to characterize the temperature at which the polymer or polymers in question are adhesive.

Whether the polymer or polymers have the form of a solution, a suspension, or a hot melt they may be mixed with suitable additives, such as dyeing agents, hydrophobizing agents such as microcrystalline wax fungicides, antioxidants, softeners, etc. Other additives which may be included are tensides, for example tensides which increase the capability of the polymer to effectively coat the fibers, or increase the flowability of the polymer, etc. An example of a type of tenside useful for this purpose is an anionic tenside, especially a sulfonate, such as an alkylaryl sulfonate.

The fiber material and the polymer or polymers may be exposed to a suitable mixing process before the mixture is supplied to a defibrator in any suitable manner. However, the fiber material which is fed to the defibrator is preferably formed as a continuous layer or web, and the polymer or polymers having the form of a solution, a suspension or a hot melt may then be sprayed onto said layer or web. As mentioned above, the polymer or polymers are preferably supplied to the web of fiber material by means of a so-called hot melt system, that is, a unit which is designed to melt said polymer to produce a low viscosity melt, and which is preferably equipped with means for keeping the melted polymer under an inert atmosphere to avoid oxidation. Suitable hot melt units are supplied, e.g., Nordson Corporation, Amherst, Ohio, U.S.A. Hot melt materials of the type sold by Delft-National Chemie, Holland, under the trade name "strukontact", e.g., EVA copolymers optionally combined with resin, wax and paraffin, are also suitable as the materials to be applied according to the present invention.

The defibrator used may be of any type which may expose fiber material to such impact or grinding forces that the fiber material is satisfactorily defibrated and that a sufficient amount of heat is generated to cause melting of the fibers with the polymer or polymers. These conditions may be fulfilled for example by a hammer or impact mill.

The polymer or polymers preferably comprise a polymer which is totally or partly film forming so that each single fiber is either completely covered by a film of the polymer, or partly covered by flattened droplet or film portions. The polymer or polymers are preferably selected so that their film forming temperature is adapted to the amount of heat generated by the impact or grinding forces in the defibrator. It has been found that the polymer or polymers should preferably have a film forming temperature of at least 75° C., preferably 80°–100° C. or even more. In some cases, it is suitable to raise the temperature during the defibration by supplying heated air to the defibrator.

In the present context, the term "film-forming" is intended to characterize a polymer which on a surface and heated to the temperature mentioned is capable of flowing to form a film within at the most 60 minutes. Preferably, the film-formation under the conditions mentioned will take place in the course of about 10 seconds or less to about 15 minutes, and it is often preferred to use polymers, the film-formation of which within such shorter period is only elicited at temperatures above 75° C.

It is preferred and often essential that the treatment in the defibrator is performed immediately after the application of the polymer, as this results in the most even distribution of the polymer. However, it is within the scope of the invention to allow the polymer applied on the fibers to dry and thereafter subject the fibers with the dried polymer to the treatment in the defibrator.

The amount of polymers and possible additives may be selected, for example, dependent on the intended use of the coated fibers. Thus, for example, if the fibers are used as binding fibers in the production of a non-woven fibers textile material, the amount of polymers and additives should be increased dependent on the amount of non-coated fibers which are mixed with the coated fibers. The amount of polymer or polymers and possible additives applied to the fiber mass should normally not exceed 50% and will sometimes preferably not exceed 20% by weight of the amount of said fiber mass. A normal range of polymer to be applied can be said to be about 5–30% by weight.

The present invention also relates to fibers coated with one or more polymers in accordance with any of the methods described above. By varying the above parameters, such as the amount and type of fiber material, polymers, additives, and coupling agents, the type of defibrator and cooling efficiency of the same, it is possible to produce a wide variety of coated fibers having characteristics adapted to the intended use.

The coated fibers produced by the method according to the invention may, for example be used for making continuous web-shaped composite products of various types, including paper, paste board, cardboard, plates, non-woven textile materials, insulating materials, etc. Such products may be produced by arranging the coated fibers, which may be mixed with other types of non-coated fibers, if desired, in a layer having a suitable thickness. The fibers may then be bonded together by exposing them to suitable solvents and/or by supplying heat thereto, for example by means of a plurality of needles, a flow of heated air, high frequency heating, compression, etc. The temperature at which the fibers must be heated in order to obtain the desired mutual adherence may be varied from about 75° C. to 260° C. and even as high as up to 400° C. by suitable selection of the polymer or polymers by means of which the fibers are coated. The web material or composite material produced may also be exposed to a hot pressing treatment or any other finishing treatment, if desired. The character of the products obtained may vary widely with the conditions under which the fibers of the invention are bonded together. Thus, e.g., higher pressures will result in more dense structures.

The coated fibers prepared according to the invention may also be used to substitute asbestos fibers as reinforcing fibers in fiber-reinforced cement products. In this regard as well as for other above-mentioned applications, it is of particular interest that the fibers produced according to the invention show a high degree of alkali resistance and of dimension stability in wet condition, which is believed to be due to the very efficient coating obtained under the vigorous conditions in the impact or grinding treatment.

From the above description it will become apparent that the method according to the invention makes it possible to produce as well the coated fibers as a web material or composite material from such fibers without the necessity of evaporating water or other liquids from the web or composite material to elicit the fiber formation of the polymer. Furthermore, the characteristics as well of the coated fibers as of the web material produced therefrom, such as softness, density, hygroscopic and hydrophobic characteristics may easily be varied and controlled. Furthermore, the coated fibers and, consequently, the web materials produced therefrom may easily be coloured by adding a suitable dye to the polymer or polymers by means of which the fibers are coated.

Especially interesting materials made from the fibers produced according to the present invention are dry-formed webs which are consolidated by eliciting the binding property of the polymer. Such webs may consist exclusively of the fibers coated according to the invention, or the fibers coated according to the invention may be incorporated in the webs as binder fibers together with other fibers, including cellulose fibers or mineral fibers, in order to obtain a material which after consolidation is bonded by the polymer-coated fibers.

EXAMPLE 1

A coating solution was made from the following components:
50 g PVC (fine powder which melts completely on heating to 250° C., Vyflex FG95A from Plastic Coating Systems Ltd., Guildford, England ("Vyflex" is a registered trade mark))
300 g tetrahydrofuran
900 g methylene chloride
0.5 g Silane A 1100 ($\gamma$-aminopropyltriethoxysilane from Union Carbide).

The solution was sprayed at ambient temperature on a web of pine cellulose pulp of a "loose" character (containing antibonding agent) ("fluff pulp" from Korsnäs-Marma, Sweden), sheet weight 750 g/cm$^2$ in amounts corresponding to a deposit of the dry polymer of 7, 15, and 28% by weight, respectively, calculated on the weight of the cellulose.

Immediately upon spraying, the pulp web was defibrated in a hammer mill from which the solvent evaporated was continuously removed.

The resulting PVC-coated fibers had a relatively stiff character, especially when coated with 28% of PVC.

The fibers were formed into a non-bonded web by dry-forming in laboratory web making equipment. The web was consolidated by compression for 20 seconds at 200° C. at a pressue of 5 kg/cm$^2$. The resulting dry-formed sheets showed satisfactory cohesion. The sheets made from the fibers coated with 28% by weight of PVC were textile-like, while the sheets made from the fibers coated with 7 and 15% by weight of PVC, respectively, were more paper-like and appeared as relatively soft tissues having a water absorbance suitable for, e.g., napkins, paper towels. etc.

EXAMPLE 2

The same procedure as described in Example 1 was followed, using a solution of the following composition:
100 g PVC (fine powder which melts completely on heating to 200° C., Vyflex DW 70 from Plastic Coating Systems, Ltd., Guildford, England)
600 g cyclohexanone
700 g methylene chloride
1 g Dynasylan Glymo ($\gamma$-glycidyloxypropyl-trimethoxysilane from Dynamit Nobel).

The results were similar to the results obtained in Example 1, but the fibers and the consolidated webs made from the fibers were somewhat softer than the products of Example 1.

EXAMPLE 3

The same procedure as in Example 1 was followed, using a solution of the following composition:
50 g PVC (Vyflex FG95A)
300 g tetrahydrofuran
500 g methylene chloride
2 g of a 60% solution of aluminum oxide stearate in white spirit, available from MOACO S.A., Lausanne, Switzerland.

The results were similar to the results obtained in Example 1.

EXAMPLE 4

The same procedure as in Example 1 was followed, using a solution of the following composition:
50 g PVC (Vyflex FG95A)
300 g cyclohexanone
700 g methylene chloride
2 g titanium oxide tallate (from MOACO S.A., Lausanne, Switzerland).

The results were similar to those obtained in Example 1.

EXAMPLE 5

The same procedure as in Example 1 was followed, using a solution of the following composition:
50 g PVC (Vyflex DW 70)
300 g tetrahydrofuran
500 g methylene chloride
0.8 g BEROL 496 (an anionic tenside consisting of lineary sodium alkylaryl sulfonate, from Berol Kemi AB, Sweden).

The results were similar to the results obtained in Example 1, but the products showed a better wet-strength while retaining an excellent water-absorbance.

EXAMPLE 6

In a hot melt unit, powdery high density polyethylene was melted under nitrogen, and the resulting molten polyethylene which had a viscosity like water was sprayed on a web of fluff pulp containing antibonding agent of the same type as described in Example 1. Prior to the treatment, the pulp had been dried to a moisture content of 2% for 18 hours at 80° C. The amount of polymer applied was about 15% by weight, calculated on the pulp weight. Immediately thereafter, the web was defibrated in a hammer mill into which air at a temperature of 50°-60° C. was introduced from an air heating unit. In a laboratory sheet-forming apparatus, a loose web was made from a slurry of the fibers. The web was consolidated by compression at 50 kg/cm$^2$ at 100° C. The resulting product was a tight, strongly water-repellent paper.

EXAMPLE 7

The same procedure as described in Example 6 was repeated using bitumen as the coating material, which was melted and sprayed on the pulp web. The resulting black fibers were made into a water-repellent sheet in the same manner as described in Example 6.

EXAMPLE 8

-Fibers prepared as described in Example 1, 28% PVC, were used in paper making from the following composition:
10 g untreated, common bleached pine sulfate cellulose fibers,
40 g of the PVC-coated fibers
2000 g tap water.

The paper making was made as wet sheet making in a laboratory sheet former. It was found that the small amount of untreated cellulose fibers was sufficient to obtain loosely bound sheets upon normal dewatering, which indicates that a composition comprising a high amount of the coated fibers of the invention can be made on any paper making machine.

EXAMPLE 9

By compression of the paper prepared in Example 8 at 200° C. for 1 minute at a pressure of 100 kg/cm$^2$, a dense, strong water-repellent material resembling fiber-reinforced PVC material was obtained.

EXAMPLE 10

65 g of the fibers prepared as described in Example 1, 28% PVC, were incorporated in a slurry with 1120 g of Portland Cement and 1600 g of water. Thereafter, sheets of a thickness of 8 mm were cast. In the sheet-forming machine, water was sucked off to a water/cement ratio of 0.30. The sheets were pressed at 65 kg/cm$^2$ and had a density of about 1.8 kg.

I claim:

1. A method of making fibers coated with a polymer, comprising adding a thermoplastic polymer which becomes sticky at temperatures from about 75° C. to about 400° C. to a fiber material, in the presence of a coupling agent selected from the group consisting of metal oxide acylates, silanes, and metal complexes, exposing the fiber material and the polymer to impact or grinding forces in a defibrator so that sufficient heat is generated to cause coating of the fibers with the polymer and so that each single fiber is individually coated, and recovering substantially individual polymer coated fibers which become adhesive at a temperature between about 75° C. to about 400° C.

2. A method according to claim 1, wherein the polymer is applied to the fiber material prior to feeding it into the defibrator.

3. A method according to claim 2, wherein the polymer is added to the fiber material in the form of a suspension or solution.

4. A method according to claim 3, wherein the suspension is water based.

5. A method according to claim 2, wherein the polymer is added to the fiber material in a melted or heat-softened condition.

6. A method according to claim 1, wherein the fiber material fed to the defibrator is a continuous layer or web, the polymer or polymers being sprayed onto the layer or web.

7. A method according to claim 1, wherein the defibrator is a hammer or impact mill.

8. A method according to claim 1, wherein the polymer comprises a polymer which is totally or partly film-forming.

9. A method according to claim 8, wherein the polymer has a film-forming temperature of at least 75° C.

10. A method according to claim 9, wherein the polymer or polymers are selected from the group consisting of polyolefins, polyvinyl acetates, polyamides, thermosetting resins, polyesters and epoxy polymers.

11. A method according to claim 1, wherein an additive selected from the group consisting of a dye and a hydrophobizing agent, are supplied to the fiber material prior to exposing it to the impact or grinding forces.

12. A method according to claim 11, wherein the additive is added to the solution, suspension, or melt of the polymer.

13. A method according to claim 12 wherein the additive is a tenside.

14. A method according to claim 1, wherein the amount of polymer applied to the fiber mass is between 5 and 30% by weight, calculated on the fiber mass.

15. Fibers coated with a polymer in accordance with the method of claim 1.

16. Fibers coated with a polymer in accordance with the method of claim 13.

17. Fibers coated with a polymer in accordance with the method of claim 14.

18. A method according to claim 13, wherein the amount of polymer applied to the fiber mass is between 5 and 30% by weight, calculated on the fiber mass.

19. A method of making fibers coated with a polymer, comprising adding a thermoplastic polymer which becomes sticky at temperatures from about 75° C. to about 400° C. to a fiber material, in the presence of a coupling agent selected from the group consisting of metal oxide acylates, silanes, and metal complexes, exposing the fiber material and the polymer to impact or grinding forces in a defibrator so that sufficient heat is generated to cause coating of the fibers with the polymer and so that each single fiber is individually coated, and recovering substantially individual polymer coated fibers which become adhesive at a temperature between about 75° C. to about 400° C., mixing said coated fibers with non-coated fibers, arranging said mixed fibers to form a layer; heating said arranged fibers to between about 75° C. to about 400° C. so that the fibers mutually adhere to form a web.

20. The process of any one of claims 1 or 19 wherein the coupling agent is a metal oxide acylate.

21. The process of claim 1 wherein the coupling agent is a silane.

22. The process of claim 1 wherein the coupling agent is a metal complex.

23. The process of claim 20 wherein the metal oxide acylate is an aluminum oxide acylate, a titanium oxide acylate, copper oxide acylate, zinc oxide acylate, antimony oxide acylate, chromium oxide acylate, iron oxide acylate or zirconium oxide acylate.

24. The process of claim 23 wherein the metal oxide acylate is an aluminum oxide acylate.

25. The process of claim 23 wherein the metal oxide acylate is a titanium oxide acylate.

26. The process of claim 21 wherein the silane is γ aminopropyltriethoxysilane or γ-glycidyloxypropyl-trimethoxy-silane.

* * * * *